Figure 1:
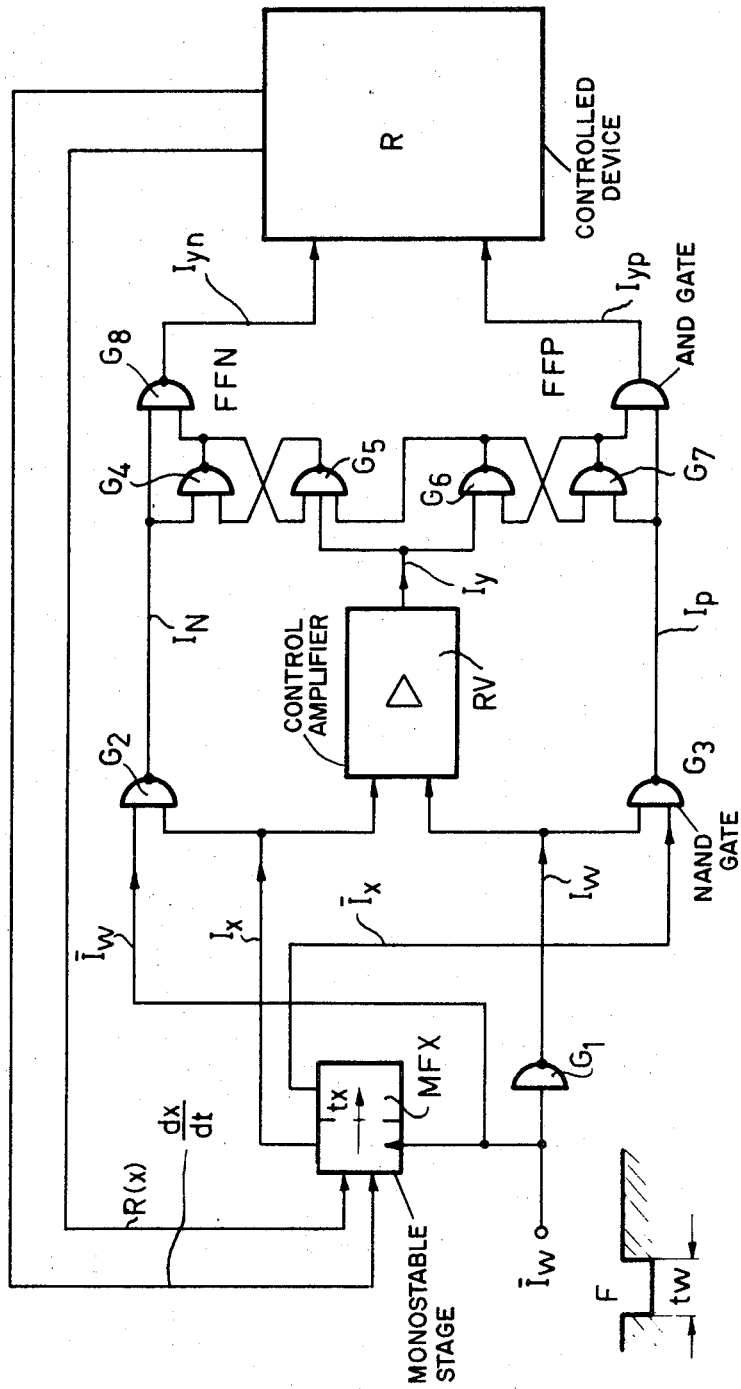

United States Patent [19]

Nissen

[11] 3,740,578
[45] June 19, 1973

[54] CIRCUIT ARRANGEMENT FOR DIGITAL SAMPLED-DATA THREE-POINT CONTROL SYSTEM

[75] Inventor: Nico Nissen, Hamburg, Germany

[73] Assignee: U.S. Philips Corporation, New York, N.Y.

[22] Filed: May 3, 1971

[21] Appl. No.: 139,511

[52] U.S. Cl. ............... 307/232, 307/234, 307/246, 307/265, 328/110, 328/133
[51] Int. Cl. ............................................. H03k 5/20
[58] Field of Search .................. 307/216, 232, 234, 307/246, 265, 266, 267; 320/110, 133; 235/151, 151.1, 151.13

[56] References Cited
UNITED STATES PATENTS

| | | | |
|---|---|---|---|
| 3,505,537 | 4/1970 | Giordano | 307/234 X |
| 3,562,673 | 2/1971 | Caspari | 307/265 X |
| 3,207,925 | 9/1965 | Berger | 307/265 X |
| 3,330,972 | 7/1967 | Malan | 307/232 X |
| 3,346,743 | 10/1967 | Strenglein | 307/267 |
| 3,393,325 | 7/1968 | Borror et al. | 307/246 X |
| 3,471,719 | 10/1969 | Hughes | 307/246 X |
| 3,473,050 | 10/1969 | Groom | 307/267 |
| 3,624,522 | 11/1971 | Glosek | 307/216 X |

Primary Examiner—Stanley D. Miller, Jr.
Attorney—Frank R. Trifari

[57] ABSTRACT

In digital sampled-date three-point control in which the desired and actually measured values are represented by pulse durations, the duration of the control signal is also influenced in accordance with the difference between the desired value and the actual value. In addition, a special circuit arrangement for this purpose is described which may readily be manufactured in integrated-circuit form and in which the actually measured value deviation is stored in a capacitor the discharge of which controls the pulse duration of the control signal.

3 Claims, 4 Drawing Figures

CIRCUIT ARRANGEMENT FOR DIGITAL SAMPLED-DATA THREE-POINT CONTROL SYSTEM

The invention relates to a circuit arrangement for digital sampled-data three-point control including a proportional part, in which at the beginning of the sampling pulse, the duration of which is a measure of the desired value, there is produced in a conversion element a pulse having a duration corresponding to the actually measured value.

Digital control circuits often either are complicated and expensive or, if this is not the case, they do not satisfy the stability requirements. For example, in the simplest case a comparison of the desired value and the measured value, which quantities are available in digital form, yields a control quantity which can have 135 three values (three-point controller). If no deviation is found, no control quantity is produced, and if there is a deviation, a constant positive or negative value, which is independent of the magnitude of the deviation, is produced as the control quantity. For small deviations this value generally is too large, so that the stability requirements are not satisfied, whereas for comparatively large deviations the control quantity may be too small, so that the trailing behaviour will be poor. Hence in most cases it will be necessary for the control quantity to have more than three values.

In a sampled-data control system the control circuit is closed for a short time only, after which there is a comparatively long interval in which the control quantity determined during the sampling acts on the process to be controlled.

Figure 2:
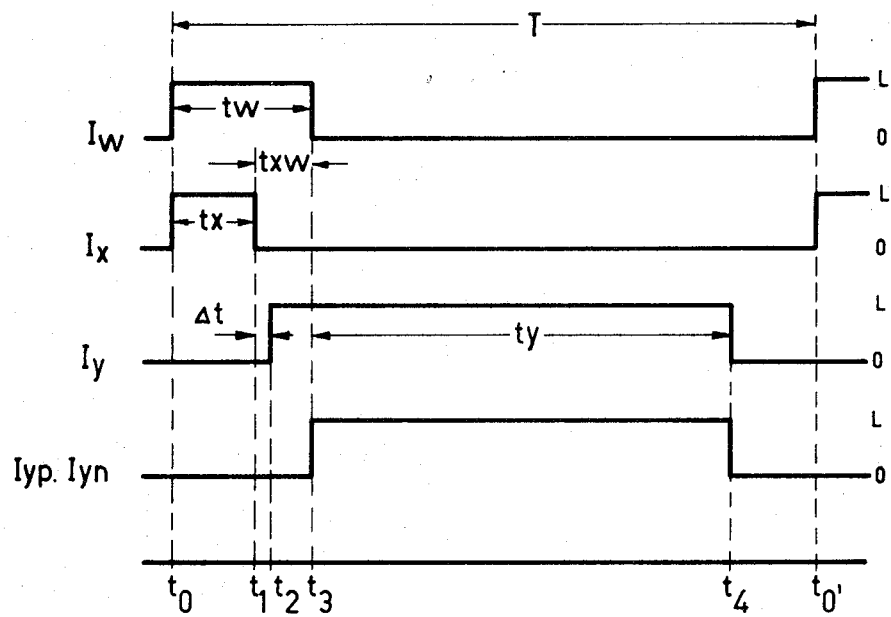
Figure 3:
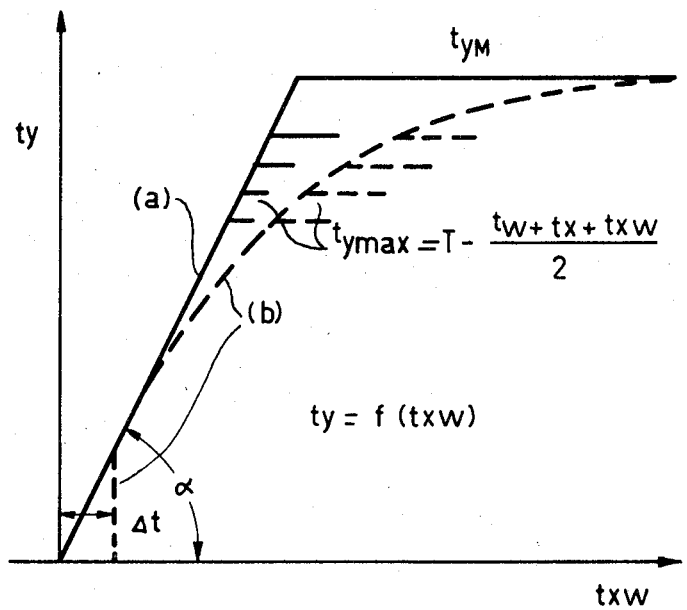
Figure 4:
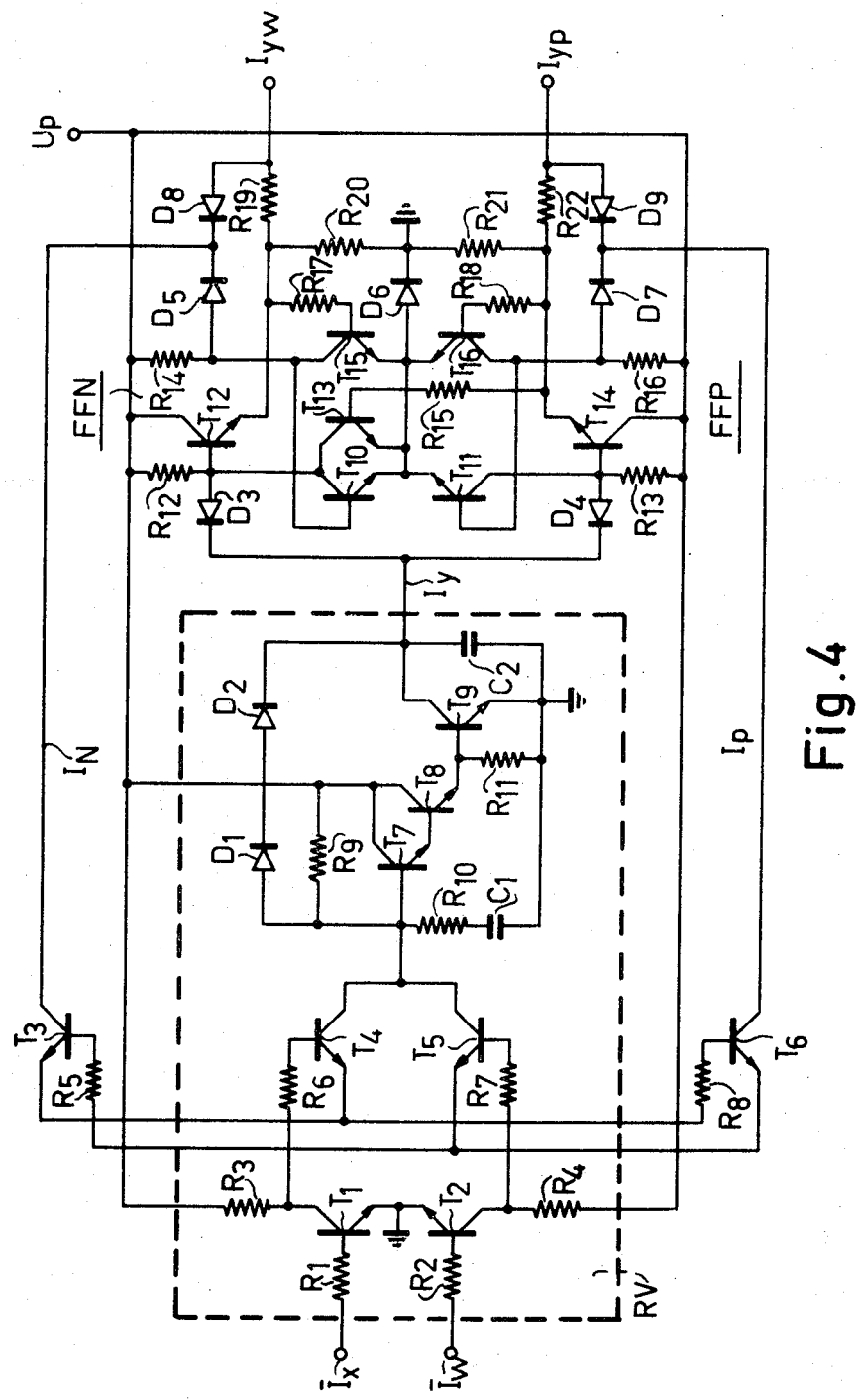

An embodiment of the invention will now be described, by way of example, with reference to the accompanying diagrammatic drawings, in which FIG. 1 shows in block-schematic form a sampled-data control system, FIG. 2 shows the associated variation in time, FIG. 3 is a diagram illustrating the pulse durations, and FIG. 4 shows an embodiment of a control system according to the invention.

Referring now to FIGS. 1 and 2, sampling begins at the leading edge of a pulse $I_w$ the pulse duration $t_w$ of which is a measure of the desired value. Simultaneously there is produced in a conversion element, which is in the form of a monostable stage MFX, a pulse $I_x$ the pulse duration $t_x$ of which is a measure of the instantaneous actual value $R(x)$ (measured value $x$), while additionally the quantity $dx/dt$ the rate of change of the measured value x may influence the value of $t_x$. Gates $G_2$ and $G_3$ serve to determine the sign of the deviation $t_{xw} = t_w - t_x$, and produce $I_p$ and $I_N$ respectively by which flip-flops FFP and FFN respectively are set. If instead of the control amplifier RV a NAND-gate is used, a three-point controller is obtained. The leading edge of a pulse $I_y$ is delayed by a time $\Delta t$. As a result there will be a time lag. Only if the deviation is greater than the time lag $\Delta t$ (FIG. 2) there will be obtained from the deviation a constant control quantity which is independent of the deviation and may be positive ($I_{yp}$) or negative ($I_{yn}$). In any case: $t_4 = t_0'$. However, this controller generally does not satisfy the stability requirements.

In contradistinction thereto the circuit arrangement according to the invention is characterized in that from the desired-value pulse $I_w$ and the actual-valve pulse $I_x$ a control amplifier produces a control pulse $I_y$ the leading edge of which begins when either the desired-value pulse $I_w$ or the actual-value pulse $I_x$ have terminated, so that the Boolean expression $(\bar{I}_w \cdot I_x) + (I_w \cdot \bar{I}_x) = 1$ is satisfied, and the trailing edge of which appears after a delay time $t_y$ after the termination of the desired-value pulse $I_w$ and the actual value pulse $I_x$, so that the Boolean expression $I_w + I_x = 0$ is satisfied, the delay time $t_y$ being proportional to the difference between the pulse duration of the desired-value pulse $I_w$ and that of the actual-value pulse $I_x$.

The new controller retains the essential advantages of the variable three-point controller, i.e., simple structure and high power amplification (switch), while having a steady behaviour.

If the part $t_y$ of the pulse duration (FIG. 2) of the output pulse $I_y$ of the control amplifier RV (FIG. 1) is made to depend on the deviation $t_{xw}$, as is shown in FIG. 3, the stability requirements may be satisfied. As has been mentioned hereinbefore, this requires the provision of a time lag $\Delta t$ and also, for the case of disturbance of the transfer of the desired quantity, of a limitation $t_y \leq t_{yM}$. Not later than the beginning of the next sampling, the control quantity determined in the preceding sampling must disappear, so that there must be provided an additional limitation of $t_y$ which is dependent on the sampling frequency ($t_4 \leq t_0'$). The values of $\alpha$ and $\Delta t$ (FIG. 3) may be set independently of one another.

The invention provides a circuit arrangement in which the function $t_y = f(t_{xw})$ has a variation $b$ as shown in FIG. 3.

An embodiment of the invention will now be described with reference to the FIG. 4 of the drawing. In the period $t_0 - t_1$ (FIG. 2) two inverter-stage transistors $T_1$ and $T_2$ are cut off, since $I_w \cdot I_x = 1$, where for binary values: $1 \approx U_p$ and $0 \approx 0$ volts. Consequently, transistors $T_4$ and $T_5$ are inversely operated and through resistors $R_3$, $R_6$, $R_4$, $R_7$ and $R_{10}$, which are small compared with $R_9$, a capacitor $C_1$ is rapidly charged to the switch-on voltage of a cascade arrangement $T_7$, $T_8$ and $T_9$. The transistor $T_9$ is switched on, so that flip-flops FFN and FFP are set through diodes $D_3$ and $D_4$ respectively.

In the period $t_1 - t_3$ (FIG. 2) only one of the two transistors $T_1$ and $T_2$ is switched on: $(\bar{I}_w \cdot I_x) + (I_w \cdot \bar{I}_x) = 1$, and hence only one of the transistors $T_4$ and $T_5$ is switched on, so that the capacitor $C_1$, which previously was charged to a voltage equal to the switch-on voltage of the cascade arrangement, now is discharged through a resistor $R_{10}$, the value of which is small compared with that of the resistor $R_9$. Thus, the voltage set up across the capacitor $C_1$ at the instant $T_3$ is a measure of the absolute value of the deviation $t_{xw} = t_w - t_x$ (FIG. 2).

During the period $t_1 - t_3$ the transistor $T_9$ is switched off, since either the transistor $T_4$ or the transistor $T_5$ is switched on. The sign will then be determined via a transistor $T_3$ or a transistor $T_6$ by a pulse $I_N$ or a pulse $I_P$ which becomes operative as a setting pulse for the flip-flop FFN or FFP respectively.

In the period $t_3 - t_0'$ the two transistors $T_1$ and $T_2$ are switched on ($I_w \cdot I_x = 0$), so that the transistors $T_3$, $T_4$, $T_5$ and $T_6$ are switched off. Now the capacitor $C_1$ will be charged to the switch-on voltage of the cascade arrangement through the large resistor $R_9$. However, owing to the larger time constant, this charging operation will take considerably more time than did the discharge operation, so that the switch-on voltage for the cascade arrangement will be reached only with some time delay, which depends on the capacitor voltage at the instant $t_3$, at an instant $t_4$. If during the period $t_1 - t_3$ the capacitor $C_1$ had been completely discharged, $t_u$ will have the maximum value $t_{uM}$. If $t_u$ becomes so large that $t_4$ would exceed $t_o'$, then owing to the fact that $0_1$ in the first instance again: $I_w \cdot I_x = 1$, the capacitor $C_1$ will quickly be charged, as has been set out hereinbefore, thereby enforcing: $t_4 = t_o'$, with consequent disappearance of the control quantity.

In order to ensure satisfactory operation for comparatively small values of $t_{xw}$ also, the voltage set up across the capacitor $C_1$ at the instants immediately preceding the instant $t_1$ must be substantially equal to the switch-on voltage which must be set up at the input of the cascade arrangement in order to reset the flip-flops at the instant $t_4$. The influence of $R_{10}$ may be neglected. This is obtained by a suitable choice of the switch-on voltage at the input of the control amplifier ($T_9$) combined with a flip-flop circuit in a manner such that a reset current flows through a diode $D_3$ or $D_4$ until the flip-flop has been changed to the reset state (in which case the current will flow via $T_{10}$ or $T_{11}$ respectively), whilst the input and the output of the cascade arrangement are interconnected by two series-connected diodes $D_1$ and $D_2$, and the resistors $R_3$, $R_4$, $R_6$, $R_7$, $R_{12}$ and $R_{13}$ have values such that the current which flows through the diodes $D_1$ and $D_2$ and the transistor $T_9$ at an instant immediately preceding the instant $t_1$ is about equal to the current required to flow through $D_3$ or $D_4$ and $T_9$ in order to reset a flip-flop. In addition, the maximum input current of the cascade arrangement thus will never exceed a value required to switch on $T_9$. Since in this case the transistors $T_7$, $T_8$ and $T_9$ will not be saturated, the dynamic behaviour of the cascade arrangement will also be improved.

At the instant $t_1$ the capacitor $C_2$ is in the discharged state. The transistor $T_9$ is switched off at the instant $t_1$. If now a set pulse $I_N$ or $I_p$ acts on the flip-flop FFN or FFP respectively, the transistor $T_{10}$ or $T_{11}$ will be switched off and the capacitor $C_2$ will be charged through $D_3$ and $R_{12}$ or through $D_4$ and $R_{13}$, so that after a period $\Delta t$ the respective flip-flop may be set. Thus the value of the capacitor $C_2$ determines the time lag $\Delta t$ with given values of $R_{12}$ and $R_{13}$.

Since when no current flows through $T_9$ the switch-on voltage of the cascade arrangement is lower at small values of $\Delta t$, no delay time will be produced at $t_{xw} < \Delta t$. This is not absolutely necessary, but it improves the behaviour of the controller in the range $t_{xw} \approx \Delta t$.

The quantities $\alpha$, $t_{uM}$ and $\Delta t$ may be set independently of one another. The value of $\alpha$ is given by the ratio $(R_9 + R_{10}/R_{10})$, $t_{uM}$ is determined by $R_9 \cdot C_1$, whilst $\Delta t$ is determined by the value of the capacitor $C_2$. The circuit arrangement may comprise either npn-transistors or pnp-transistors.

What is claimed is:

1. A circuit arrangement for a digitally sampled-data three point control system wherein a desired value is indicated by the pulse width of a desired-value pulse at the beginning of a sampling period, wherein the actual measured value is indicated by the pulse width of a measured-value pulse initiated simultaneously with the beginning of the desired-value pulse; comprising a control amplifier connected to the desired-value pulse; the control amplifier comprising first means for sensing the termination of the desired-value pulse, second means for sensing the termination at the measured-value pulse, third means responsive to the first and second means for producing a control pulse having a pulse width corresponding to the difference between the pulse widths of the desired-value pulse and the measured-value pulse and having a leading edge delayed from the trailing edge of the first of the desired-value and measured-value pulses to terminate by an amount corresponding to the difference between the pulse widths of the desired-value pulse and the measured-value pulse.

2. A circuit arrangement as claimed in claim 1, further comprising means for terminating the control pulse before the next following sampling period independent of the difference between the pulse widths of the measured-value and desired-value pulses.

3. A circuit arrangement as claimed in claim 1, wherein the first means comprises a first transistor (T5), means connecting the base of the first transistor to the desired-value pulse, a second transistor (T3), and means connecting the emitter of the first transistor (T5) to the base of the second transistor (I3); wherein the second means comprises a third transistor (T4), means connecting the base of the third transistor to the measured-value pulses, a fourth transistor (T6), and means connecting the emitter of the third transistor (T4) to the base of the fourth transistor (T6); wherein the third means comprises a cascade arrangement of transistors (T7, T8 and T9) having an input connected to the collectors of the first and third transistors (T5,T4) a first resistor (R9) connecting the collectors of the first and third transistors (T5,T4) to a supply voltage (Ut), a capacitor (C1) connected to a reference potential, a second resistor (R10) having a resistance less than that of the first resistor and connected in series with the capacitor (C1) to the input of the cascade series of transistors (T7, T8 and T9), and a series combination of two diodes (D1.D2) connected across the input (the base of T7) and the output (the collector of T9) of the cascade series of transistors (T7, T8 and T9).

* * * * *